P. D. BREWSTER.
PHOTOGRAPHIC CAMERA.
APPLICATION FILED NOV. 7, 1914. RENEWED DEC. 16, 1916.
1,277,041.
Patented Aug. 27, 1918.
2 SHEETS—SHEET 1.
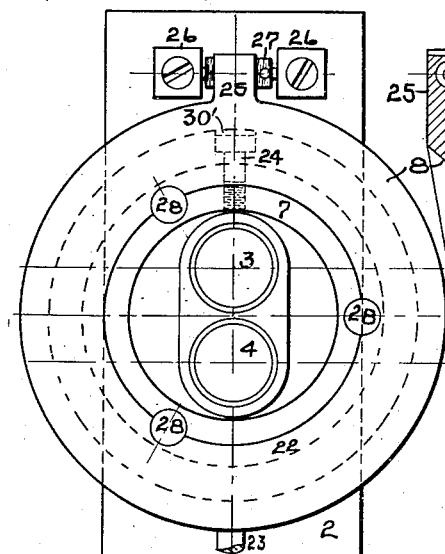
FIG-2-
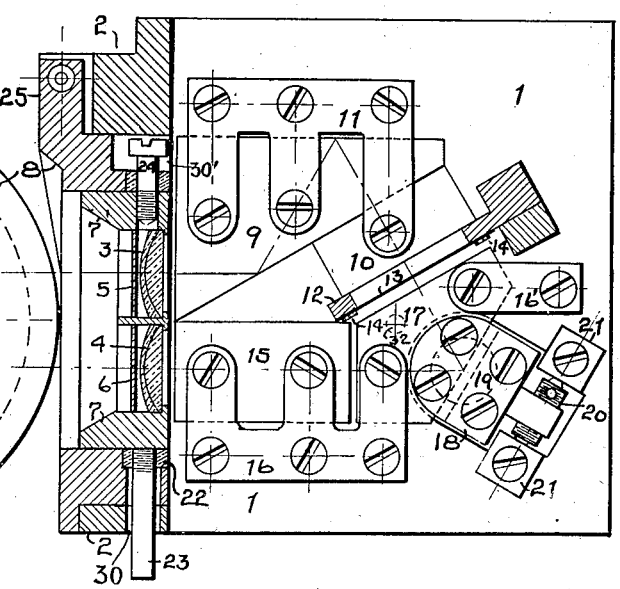
FIG-1-
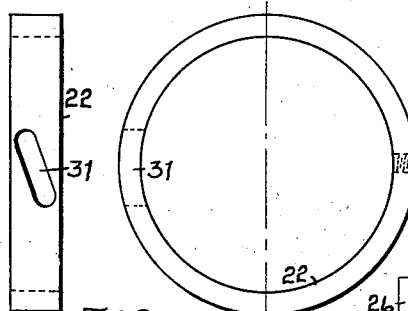
FIG-8  FIG-9-  FIG-4-  FIG-5-
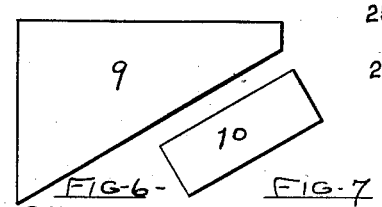
FIG-6-  FIG-7
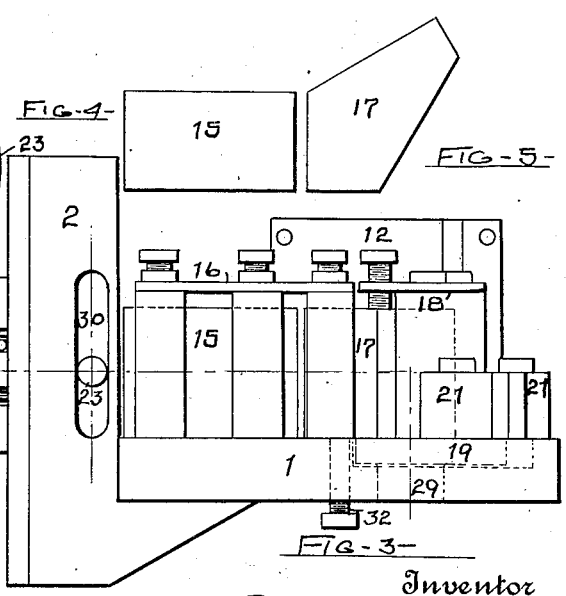
FIG-3-
Witnesses:
Inventor
Percy D Brewster
By his Attorneys
Kerr, Page, Cooper & Hayward P. D. BREWSTER.
PHOTOGRAPHIC CAMERA.
APPLICATION FILED NOV. 7, 1914. RENEWED DEC. 16, 1916.
1,277,041.
Patented Aug. 27, 1918.
2 SHEETS—SHEET 2.
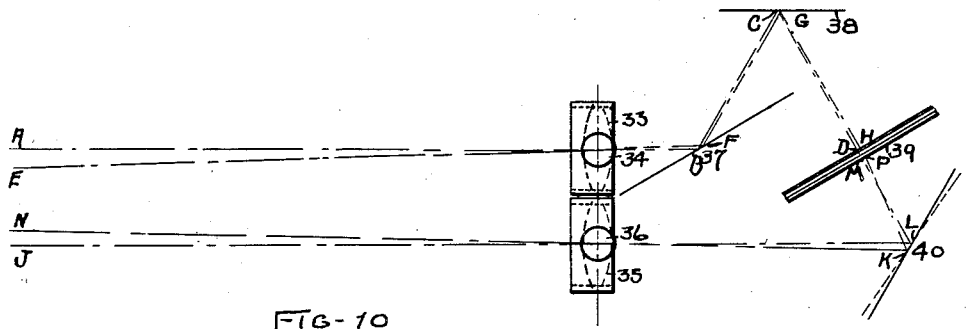
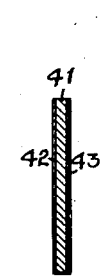
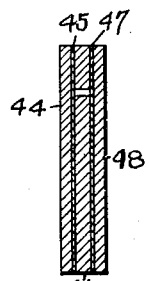
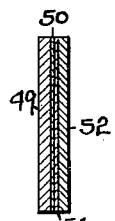
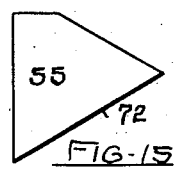
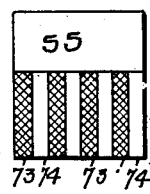
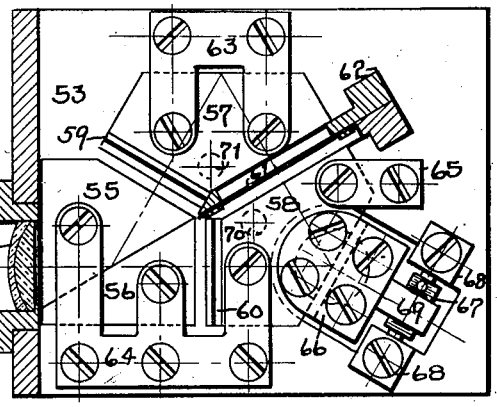
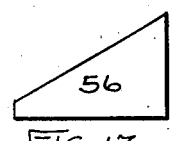
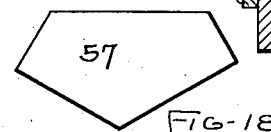

UNITED STATES PATENT OFFICE.

PERCY D. BREWSTER, OF EAST ORANGE, NEW JERSEY, ASSIGNOR TO BREWSTER FILM CORPORATION, OF NEWARK, NEW JERSEY, A CORPORATION OF NEW YORK.

PHOTOGRAPHIC CAMERA.

1,277,041.   Specification of Letters Patent.   Patented Aug. 27, 1918.

Application filed November 7, 1914, Serial No. 870,752. Renewed December 16, 1916. Serial No. 137,475.

*To all whom it may concern:*

Be it known that I, PERCY D. BREWSTER, a citizen of the United States, residing at East Orange, in the county of Essex and State of New Jersey, have invented certain new and useful Improvements in Photographic Cameras, of which the following is a full, clear, and exact description.

This invention relates to color photography, particularly cinematography in colors, and its chief object is to provide a camera for utilizing film of the general types described in my co-pending applications Ser. No. 747,712, filed Feb. 11, 1913, Ser. No. 776,782, filed July 1, 1913, Ser. No. 841,797, filed May 29, 1914, and Ser. No. 846,966, filed June 24, 1914, which, in general, describe film having two sensitized surfaces, one to be acted on by one color group of the spectrum and the other by another color group.

In my co-pending patent application Ser. No. 815,153, filed Jan. 29, 1914, I have described a method by which similar registering images may be projected on two sensitized surfaces, the images being formed by either one or two lenses.

In the accompanying drawings, Figure 1 is a sectional plan view of a camera (omitting the outer light-tight box or casing) embodying my invention;

Figs. 2 and 3 are front and side elevations of the same;

Figs. 4, 5, 6 and 7 are plan views of the prisms used in the camera;

Figs. 8 and 9 are a side elevation and a plan view of an adjusting ring used in the lens mount;

Fig. 10 is a registering diagram of the camera;

Figs. 11, 12 and 13 are sections through some of the various forms of film adapted for use in the camera;

Fig. 14 is a sectional plan view of a single lens camera;

Figs. 15, 16, 17 and 18 are plan views and side elevations of the prisms used in Fig. 14.

The lens diaphragms, shutters and intermittent feeding mechanism for controlling the passage of the film through the film gate are omitted for the sake of clearness as they are well known in the art.

The camera 1, shown in Fig. 1, is provided with two lenses 3 and 4, mounted in the housing 7, the two lenses being preferably as nearly as possible of the same focal length and mounted, preferably, at substantially the same distance from the film 13 held in place in the film gate 12 by light springs 14, 14. Rays of light from the object (not shown) are received by lens 3, projected through the reflecting prism 9 (being reflected twice owing to the prism being silvered on its back) and the glass block or transmitting prism 10 in succession and are finally brought to suitable focus to form an image of the object in the plane of one of the sensitive coatings on the film 13. Similarly, the lens 4, with the help of the glass block 15 and prism 17, produces an image in the plane occupied by the other sensitized surface of the film 13, which in age may be, in general substantially congruent with that on the other sensitized surface, subject only to the unavoidable separation of the image due to the thickness of the film. To produce congruence it is evident that the number of reflections in the case of one image (either one) must be even and the other odd.

In cinematographic work it is customary to use, for studio work at least, a lens of 2 inches focal length in order to secure the maximum depth of field and to avoid excessive distance between the camera and stage. The use of glass prisms and blocks between the lens and film permits the employment of the lens of a focal length about one-third shorter than would be the case if mirrors were used. Thus it is possible to use, in a camera of the type illustrated in Fig. 1, with standard sized film, a lens of less than two and three-quarter inches focal length, while if mirrors are used the focal length would increase to three and three-quarter inches with the resulting loss in depth of field.

It is apparent that provision must be made to secure proper registration between the images projected on the two sides of the film, and this registration may be obtained in any convenient manner, as by mounting the prism 9 and the block 15 with their front surfaces substantially at right angles to the axes of the lenses and held against the bed plate 1 (preferably ground flat) by means of spring clips 11 and 16 respectively while the prism 17 is clamped in the holder 19 by means of a spring 18, the holder 19 being provided with a stub shaft 29 adapted to turn in a hole in the base 1. The base is recessed so as to permit the bottom of the holder to be normally below the surface of the base, so that the prism 17 is supported with its lower surface resting on the base. The holder 19 is provided with a projection which is tapped out to receive the capstan screw 20, the ends of which fit snugly between the stops 21, 21 secured to the base. By turning the capstan screw 20 the holder 19 and prism 17 will turn on the center of the stub shaft 29 (which is directly beneath the point on the reflecting surface of the prism 17 struck by the axial ray of light from the lens 4) and consequently the image is shifted in either direction (according to the adjustment of the screw) in relation to the image on the other side of the film until exact registration in azimuth is secured, after which the screws in the spring clips are tightened down to clamp the prism in its final position and then, preferably, the screws in the spring clip 18 are loosened so that the prism is held solely by the base and clips 16, 16'.

The adjustment in altitude may be obtained in several ways, but is complicated by the necessity of providing relative movement between the twin lenses and the film for focusing purposes while maintaining the same horizontal plane between their axes as any shifting of the plane would cause great errors in altitude and slight errors in azimuth.

The twin lenses are mounted in the holder, 7, which, in turn, is mounted in the collar 8, which is adapted to turn in the front 2 attached to the base 1, the center of revolution being on a line halfway between the axes of the two lenses, the collar 8 being provided with an ear piece 25 tapped out to receive the capstan screw 27, the ends of which are adapted to fit snugly between the stops 26, 26 mounted on the front 2 of the camera. It is apparent that by shifting the screw 27 the images can be shifted in altitude on the two sides of the film until proper registration is secured.

One or more straight guide pins 28, 28 are mounted in holes drilled and reamed parallel to the lens axes through the edges of the holder 7 and collar 8 so as to prevent any turning of the holder 7 in the collar when the holder is forced in and out of the collar in focusing, thereby maintaining the same registration irrespective of focusing. Focusing is controlled by the slip ring 22, Figs. 8 and 9, containing the inclined slot 31, through which the screw 24, tapped into the holder 7, and held in place in the collar, passes. When the slip ring 22 is turned, by means of the focusing lever 23 passing through slot 30 in the camera front (Fig. 3), the screw 24 causes the holder to move axially in the collar, the upper part and head of the screw 24 moving in a slot 30' in the side of the collar, parallel to the axes of the lenses.

The capstan adjustment for altitude may be dispensed with and the two lenses set with the plane of their axes as near as possible parallel with the base and the prism 17 canted on one side or the other by means of thin packing such as gold leaf or paper until the images are in registry, or a screw 32 (Figs. 1 and 3) may be tapped through the base 1 so it will bear against one side of the prism 17 and registry in altitude secured by adjusting the screw.

Perfect registry in azimuth cannot be secured for all distances by one setting or adjustment in a twin lens camera due to parallax between the lenses but individual cameras can be set for different distances in which the errors are too small to be noticed. For example a camera can be set for scenery, and objects from sixty or seventy-five feet or over will then be in substantial registry, another camera for studio use in which objects from twenty to thirty feet will be a substantial registration.

When the second reflecting surface of the prism 9 is parallel to the optical axis of the lens 3, as in the construction illustrated, the film 13 must be so mounted in the film gate 14 that it will be in a plate exactly parallel to the first reflecting surface of the prism 9, so that the axial ray from the lens 3 will strike the film at right angles; and the reflecting and emitting surfaces of the prism 17 must be arranged to cause the axial ray from lens 4 to strike the film perpendicularly.

Plan views of blocks 15, prisms 17 and 9, and block 10 are shown in Figs. 4, 5, 6 and 7 respectively.

In place of mounting the twin lenses with their axes absolutely parallel, the lens systems 33 and 35, Fig. 10, may be mounted to turn independently in their housing on stub shafts 34 and 36 which are substantially perpendicular to the plane passing through the axes of the lenses, so the two axes may be inclined to meet at any given distance from the camera. With the axes parallel the course of the axial rays from the object though one lens is through the points A—B—C to point D on the film 39, the light rays being bent by reflectors 37 and 38. Through the other lens the rays follow the path J—L—M onto the film, the light being reflected once by reflecting surface 40, while if the lenses are inclined toward an object (not shown) at less than an infinite distance away paths of the light rays are through the points E—F—G—H and N—K—P, the reflector 40 being shifted (as indicated by the dotted lines) to make the images coincide.

Any type of film having two sensitized surfaces adapted to record the action of colored light may be used in this camera. Fig. 13

11 illustrates a double-coated film color-sensitized on the two sides, composed of a support 41 and emulsions 42, 43; Fig. 12 a film having two supports 44 and 48 coated with color sensitive emulsions 45 and 47 respectively and joined together temporarily or permanently by separator 46. Fig. 13 illustrates two separate film supports 49 and 52 with sensitized surfaces 50 and 51 respectively adapted to be fed simultaneously and in unison through the same film gate. These films are more thoroughly described in my co-pending applications above mentioned.

The sensitive surfaces, in any of the types of film used, may be both panchromatically sensitized, or one surface sensitized chiefly for one group of colors in the spectrum, say, from yellow-green to violet and the other chiefly for the red to yellow color-group. If both surfaces are sensitized panchormatically light filters 5 and 6 (Fig. 1) are mounted in the paths of the rays, for example in front of the lenses 3 and 4 respectively, to permit light of only the proper color-group to act on either of the sensitized surfaces.

A camera with a single lens system is illustrated in Fig. 14, in which the light passing through the lens 54 is divided into two divisions by the reflecting surface of the prism 55, the light of one division passing through light filter 59 and being reflected by prism 57 against one of the sensitized surfaces of the film 61 in the film gate 62, while the light of the other division passes through prisms 56 and 58 and is reflected against the other sensitive surface of the film 61. Registration in azimuth is obtained in a manner similar to that described for the twin lens camera, the prism 58 being clamped in the holder 69 by means of spring slip 66, the holder being provided with a stub shaft adapted to turn in a hole in the base 53; the center of this hole being directly beneath the point (on the reflecting surface of the prism 58) struck by the axial ray from the lens 54. The base is recessed so as to allow the holder to be below the surface of the base normally and to permit the prism 58 to be supported near its edges on the ground base of the camera. The holder 69 is provided with a projection which is tapped out to receive the capstan screw 67, the ends of which fit snugly between the stops 68, 68 secured to the base. By adjusting the capstan screw 67 the images on the two sides can be brought into perfect registry and the prism clamped in place by tightening the screws in the spring clips 64 and 65 against the prism, the prisms 55, 56 and 57 being held in place by the spring clips 63 and 64. Instead of making the final adjustment by shifting the prism 58, the latter can be clamped as soon as the image which is projected through it is in focus and in fair registry with that projected through the prism 57; after which the final adjustment is made by turning the combined prisms 55—56 horizontally on the point where the axial ray meets their contiguous surfaces.

If the base 53 is ground perfectly flat and the bases of all the prisms are exactly at right angles to their reflecting surfaces the images will always be in registry in altitude, but any error may be compensated for by placing thin paper or gold leaf (not shown) beneath either edge of the prisms 57 and 58, or by means of adjusting screws 70 and 71, tapped through the base 53 and adapted to bear respectively against the edges of the prisms 57 and 58 so as to cant either one or the other.

The reflecting surface of the prism 55 is about half silvered, preferably in bands or stripes 73 with the rest of the surface clear as at 74, and is cemented to the prism 56 by means of a substance such as Canada balsam, so that about half the light will be reflected and half transmitted.

The reflecting surface in the camera, as illustrated, is inclined thirty degrees to the axis of the lens, an inclination well within the angle of total reflection. Hence the silvering may be dispensed with and spaced bands of balsam used to make those portions transmit light. By suitably varying the width and spacing of the silver or balsam bands more or less light can be transmitted or reflected, as the case may be, to compensate for any difference in the "speed" of the two emulsions in respect to their particular color groups. The reflecting surfaces of prisms 57 and 58 are silvered. The film should be mounted in a plane which is a continuation of the reflecting surface of the prism 55.

Figs. 15 and 16 illustrate plan and end views of the prism 55, Fig. 17 the plan of prism 56, and Fig. 18 the plan of prisms 57 and 58 (reversed).

It is apparent that when glass prisms are used for reflecting the two groups of light rays must pass through substantially the same distance in glass of the same index of refraction to produce images of the same size on the film.

It has been shown in my copending applications before mentioned, that in the ordinary projector the convergence of marginal rays from the condenser through the outer portions of the positive film is sufficient to seriously impair the registry on the screen, of the two images projected from a film having exactly superposed images on its opposite sides. Consequently, to secure sufficiently good registration of the projected images it may sometimes be necessary that the image on the side of the film nearer the condensing lens be slightly larger than the other images though exactly registering or superposed in the center. The images may be made in different sizes in the twin lens camera by using lenses of very slightly different focal lengths; or, in either type of camera, by lenses that are corrected for the different color groups at slightly different focal lengths or by passing one color group through less glass than the other.

What I claim is:

1. The combination in a photographic camera, of means for supporting in position for exposure two superposed sensitized surfaces, optical image-projecting means to receive light emanating from the object to be photographed, a plurality of reflecting devices between the said image-projecting means and the said supporting means to reflect on the two said sensitive surfaces independent images of the same object, and devices for adjusting at least one of the said reflecting devices.

2. The combination in a photographic camera, of means for supporting in position for exposure two superposed color-sensitized surfaces, and optical means, including a plurality of reflecting devices and at least one ray filter, for projecting on the said color-sensitized surfaces in the said supporting means independent images of the same object, one image in the light of one or more colors of a given color-group and the other image in the light of other colors.

3. The combination in a photographic camera, of means for supporting in position for exposure two superposed sensitized surfaces, and optical means for projecting on the two said sensitized surfaces independent images of the same object centrally congruent but differing in size.

4. The combination in a photographic camera, of means for supporting in position for exposure two superposed sensitive surfaces, and optical means for projecting on one of the said surfaces so supported and in one or more colors of a group of colors of the spectrum, an image of the object to be photographed, and upon the other said surface in one or more colors of another color-group an independent image of the same object.

5. The combination in a photographic camera, of means for supporting in position for exposure two superposed color-sensitized surfaces and optical means including a plurality of reflectors and light filters, for projecting on the said color sensitized surfaces in the said supporting means independent images of the same object, one image in the light of one or more colors of a given color-group and the other image in the light of one or more colors of another color-group.

6. The combination in a photographic camera, of means for supporting in position for exposure two superposed color-sensitized surfaces, optical means for projecting, upon one of the said sensitized surfaces so supported, and in one or more colors of a group of colors in the spectrum an image of the object to be photographed, and upon the other said surface in one or more colors of another color-group an independent image of the same object, the said optical means including a plurality of reflectors for bending the rays of light and means for making the images different in size but centrally congruent.

7. The combination in a photographic camera, of means for supporting in position for exposure two superposed color-sensitized surfaces, and optical means for projecting on one of the said surfaces so supported and in light predominantly green in color an image of the object to be photographed and on the other said surface a suitably registering independent image predominantly red in color.

8. The combination in a photographic camera, of means for supporting in position for exposure two superposed color-sensitized surfaces, and optical means for projecting on one of the said surfaces so supported and in light predominantly green in color an image of the object to be photographed and on the other surface an image of the same object, centrally congruent with the first-named image but in size different therefrom and in light predominantly red in color.

9. The combination, in a photographic camera, of optical projecting means for receiving light from an object to be photographed, a plurality of reflectors, one of the said reflectors having a reflecting surface arranged at an angle to the axis of the said projecting means, and means for mounting in position for exposure two sensitized surfaces in a plane substantially parallel to the said reflecting surface.

10. The combination in a photographic camera, of two lenses adapted to receive light from the object to be photographed, a plurality of reflectors in the camera, one of the said reflectors having a reflecting surface arranged at an angle to the axis of one of the said lenses, and means for supporting in a position for exposure two superposed sensitized surfaces in a plane substantially parallel to the said reflecting surface.

11. The combination in a photographic camera, of a flat base, a pair of lenses, a front piece carrying the two lenses, two reflecting devices mounted on the said base behind the lenses, a film-gate adapted to support two sensitized surfaces in position for exposure, and means for rotatively adjusting at least one of the said reflecting devices.

12. The combination in a photographic camera, of a flat base plate, a pair of lenses, a front carrying the two lenses, two reflecting prisms and two transmitting prisms mounted on the said base plate, a film-gate adapted to support in position for exposure two sensitized surfaces in a plane substantially parallel to a reflecting surface, of one of the said reflecting prisms.

13. The combination in a photographic camera, of a pair of lenses arranged side by side, a reflecting prism having two reflecting surfaces arranged in rear of and adjacent to one of the lenses, a reflecting prism in rear of the other lens and relatively remote therefrom, a film-gate between the prisms and arranged to support two sensitized surfaces in a plane substantially parallel to the first reflecting surface of the first-named prism, and means for relatively adjusting the second prism on an axis through the point where the axial ray from its lens strikes its reflecting surface.

14. The combination in a photographic camera, of a pair of lenses arranged side by side, means in rear of the lenses for supporting two superposed sensitized surfaces, reflecting devices between the lenses and the said supporting means, a carrier for the lenses, and means for rotating the carrier on an axis substantially parallel to the axes of the lenses.

15. In a photographic camera, the combination of means for supporting in position for exposure a film sensitized on both sides, a pair of differently colored light filters, and means for projecting through one filter and upon one side of the film an image of an object to be photographed and through the other filter and upon the other side of the film an image of the same object in suitable registry with the first-mentioned image.

16. In a photographic camera, in combination, means for supporting in position for exposure a film sensitized on both sides, and optical means, including a plurality of reflecting devices, for producing in the two planes occupied by the two sensitized sides of the film independent optical images of the same object in suitable registry with each other.

17. In a photographic camera, in combination, optical means for receiving light from an object to be photographed, and a plurality of reflecting devices in rear of said means to reflect light therefrom into focus at two parallel planes and produce therein two separated images of the object in suitable registry with each other.

18. In a photographic camera, in combination, optical projecting means to receive and project light from an object to be photographed, means for supporting a film in rear of said means and at an angle to the axial rays therethrough, and a plurality of reflecting devices between the first and second named means to reflect the light from the first into focus at the opposite surfaces of a film in the second named means for the production of two independent and separated images of the object in suitable registry with each other.

19. In a photographic camera, in combination, a pair of lenses to receive and project light from an object to be photographed, means in rear of the lenses to support a film in position for exposure, reflecting devices to receive light from the lenses and direct the same to the film to form simultaneously thereon two images of the object, and means permitting the inclination of the optical axes of the lenses to be varied relatively to each other.

20. In a photographic camera, in combination, a pair of lenses to receive and project light from an object to be photographed, means in rear of the lenses to support a film in position for the formation thereon of two images of the object simultaneously, and means to permit tilting of the lenses on parallel axes perpendicular to their optical axes to vary the relative inclination of the latter axes.

21. In a photographic camera, in combination, a pair of lenses to receive and project light from an object to be photographed, pivotally supported mountings for the lenses permitting the lenses to be tilted to vary the relative inclination of their optical axes, and means for supporting a film in position for exposure to light from the lenses for forming simultaneously on the film two images of the object.

In testimony whereof I affix my signature in the presence of two subscribing witnesses.

PERCY D. BREWSTER.

Witnesses:
  M. Lawson Dyer,
  S. S. Dunham.